(12) United States Patent
Michailov et al.

(10) Patent No.: US 8,996,909 B2
(45) Date of Patent: Mar. 31, 2015

(54) MODELING DISTRIBUTION AND FAILOVER DATABASE CONNECTIVITY BEHAVIOR

(75) Inventors: Zlatko V. Michailov, Redmond, WA (US); David W. Olix, Woodinville, WA (US); Matt A. Neerincx, Sammamish, WA (US); Chadwin J. Mumford, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 12/575,475

(22) Filed: Oct. 8, 2009

(65) Prior Publication Data

US 2011/0087636 A1  Apr. 14, 2011

(51) Int. Cl.
*G06F 11/00* (2006.01)
*G06F 11/20* (2006.01)
*G06F 17/30* (2006.01)

(52) U.S. Cl.
CPC ...... *G06F 17/30575* (2013.01); *G06F 11/2094* (2013.01); *G06F 11/2023* (2013.01)
USPC .......................................................... 714/6.3

(58) Field of Classification Search
USPC ................ 709/223; 714/4.11, 4.12, 4.2, 6.22, 714/6.23, 6.3, 13
See application file for complete search history.

(56) References Cited

U.S. PATENT DOCUMENTS

| | | | |
|---|---|---|---|
| 6,298,451 B1 * | 10/2001 | Lin .................................. | 714/4.2 |
| 6,633,955 B1 * | 10/2003 | Yin et al. ....................... | 711/114 |
| 6,751,659 B1 * | 6/2004 | Fenger et al. .................. | 709/223 |
| 6,775,230 B1 * | 8/2004 | Watanabe et al. ............. | 370/228 |
| 6,944,785 B2 * | 9/2005 | Gadir et al. ................... | 714/4.11 |
| 6,947,981 B2 * | 9/2005 | Lubbers et al. ............... | 709/223 |
| 7,076,690 B1 * | 7/2006 | Todd et al. ....................... | 714/13 |
| 7,225,356 B2 * | 5/2007 | Monitzer ......................... | 714/12 |
| 7,243,156 B2 * | 7/2007 | Hahn et al. .................... | 709/231 |
| 7,272,613 B2 * | 9/2007 | Sim et al. ....................... | 709/223 |
| 7,287,180 B1 | 10/2007 | Chen et al. | |
| 7,287,186 B2 * | 10/2007 | McCrory et al. ................ | 714/13 |
| 7,307,948 B2 * | 12/2007 | Infante et al. ................. | 370/225 |
| 7,444,538 B2 * | 10/2008 | Sciacca .......................... | 714/4.1 |
| 7,475,285 B2 * | 1/2009 | Wang et al. ..................... | 714/13 |
| 7,516,221 B2 | 4/2009 | Souder et al. | |
| 7,590,719 B2 * | 9/2009 | Mashima et al. ............. | 709/223 |
| 7,620,710 B2 * | 11/2009 | Kottomtharayil et al. .... | 709/223 |
| 7,702,947 B2 * | 4/2010 | Peddada ........................ | 714/4.1 |
| 7,734,797 B2 * | 6/2010 | Mueller ......................... | 709/229 |
| 7,971,094 B1 * | 6/2011 | Benn et al. ....................... | 714/13 |
| 7,984,151 B1 * | 7/2011 | Raz et al. ....................... | 709/226 |

(Continued)

OTHER PUBLICATIONS

Chase, et al., "Dynamic Virtual Clusters in a Grid Site Manager", retrieved at <<http://www.cs.duke.edu/~justin/papers/cod-grid.pdf>>, Jun. 22-24, 2003, pp. 11.

*Primary Examiner* — Joshua P Lottich
(74) *Attorney, Agent, or Firm* — Nick Chen; Kate Drakos; Micky Minhas

(57) ABSTRACT

Aspects of the subject matter described herein relate to database connectivity behavior. In aspects, an entity seeking to access data that is replicated via instances of a database follows a plan. The plan provides information as to which instance(s) the entity is to attempt to access the data from. The plan may include connection data that indicates parameters the entity is to use in connecting to the instance(s). The plan may also indicate one or more other instances from which the entity may attempt to access the data if the client is not able to access the data from initial instance(s).

20 Claims, 7 Drawing Sheets

(56) References Cited

U.S. PATENT DOCUMENTS

| | | | |
|---|---|---|---|
| 8,024,600 B2* | 9/2011 | Sciacca | 714/4.11 |
| 8,046,446 B1* | 10/2011 | Karr et al. | 709/223 |
| 8,065,559 B2* | 11/2011 | Kamath et al. | 714/10 |
| 8,069,139 B2* | 11/2011 | Garbow et al. | 707/609 |
| 2002/0049859 A1 | 4/2002 | Bruckert et al. | |
| 2004/0078632 A1* | 4/2004 | Infante et al. | 714/5 |
| 2006/0090095 A1* | 4/2006 | Massa et al. | 714/4 |
| 2007/0250608 A1 | 10/2007 | Watt | |
| 2008/0155517 A1 | 6/2008 | Yan et al. | |
| 2009/0063501 A1 | 3/2009 | Buckler et al. | |
| 2009/0089300 A1 | 4/2009 | Vicente | |
| 2009/0113018 A1 | 4/2009 | Thomson et al. | |
| 2009/0119306 A1* | 5/2009 | Garbow et al. | 707/10 |
| 2009/0300407 A1* | 12/2009 | Kamath et al. | 714/4 |

\* cited by examiner

MODELING DISTRIBUTION AND FAILOVER DATABASE CONNECTIVITY BEHAVIOR

BACKGROUND

A database may be replicated on multiple nodes. These nodes may be located together or may be distributed in multiple locations. When a database is replicated on nodes that are located at a single location, a node that sits in front of other nodes may distribute requests to the nodes according to availability or other factors. This approach, however, does not scale well, may impose additional burdens for security, and may not be well suited when the nodes are distributed in multiple locations or even when nodes are located at a single location.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to database connectivity behavior. In aspects, an entity seeking to access data that is replicated via instances of a database follows a plan. The plan provides information as to which instance(s) the entity is to attempt to access the data from. The plan may include connection data that indicates parameters the entity is to use in connecting to the instance(s). The plan may also indicate one or more other instances from which the entity may attempt to access the data if the client is not able to access the data from initial instance(s).

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
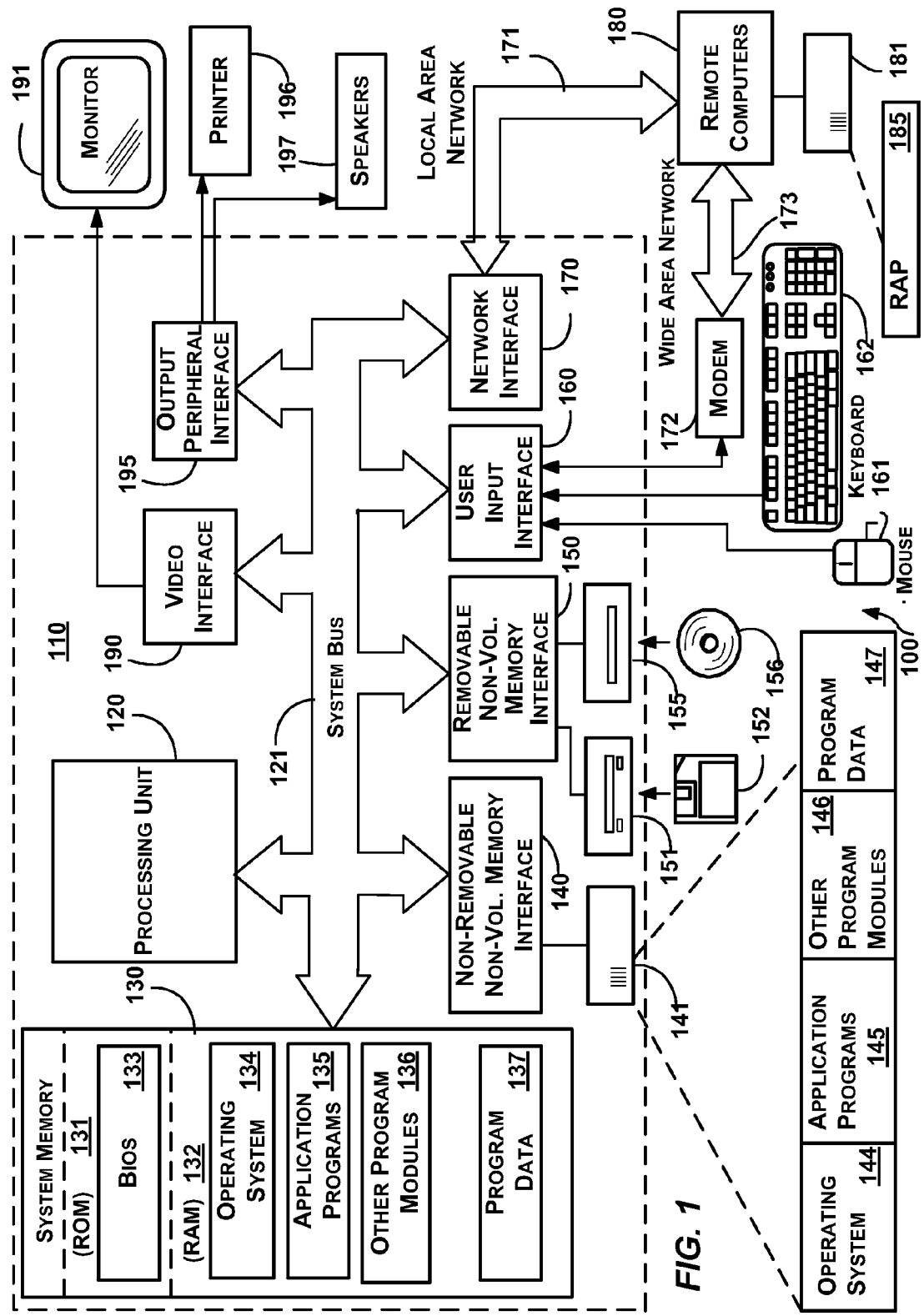
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Connectivity Behavior

As mentioned previously, effectively distributing database requests to instances of a database is challenging. As used herein, the term "instance of a database" is to be read to include one or more processes that provide access to data of a database. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

Access as used herein may include reading data, writing data, deleting data, updating data, a combination including two or more of the above, and the like.

The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include program code, program state, program data, other data, and the like.

Figure 2:
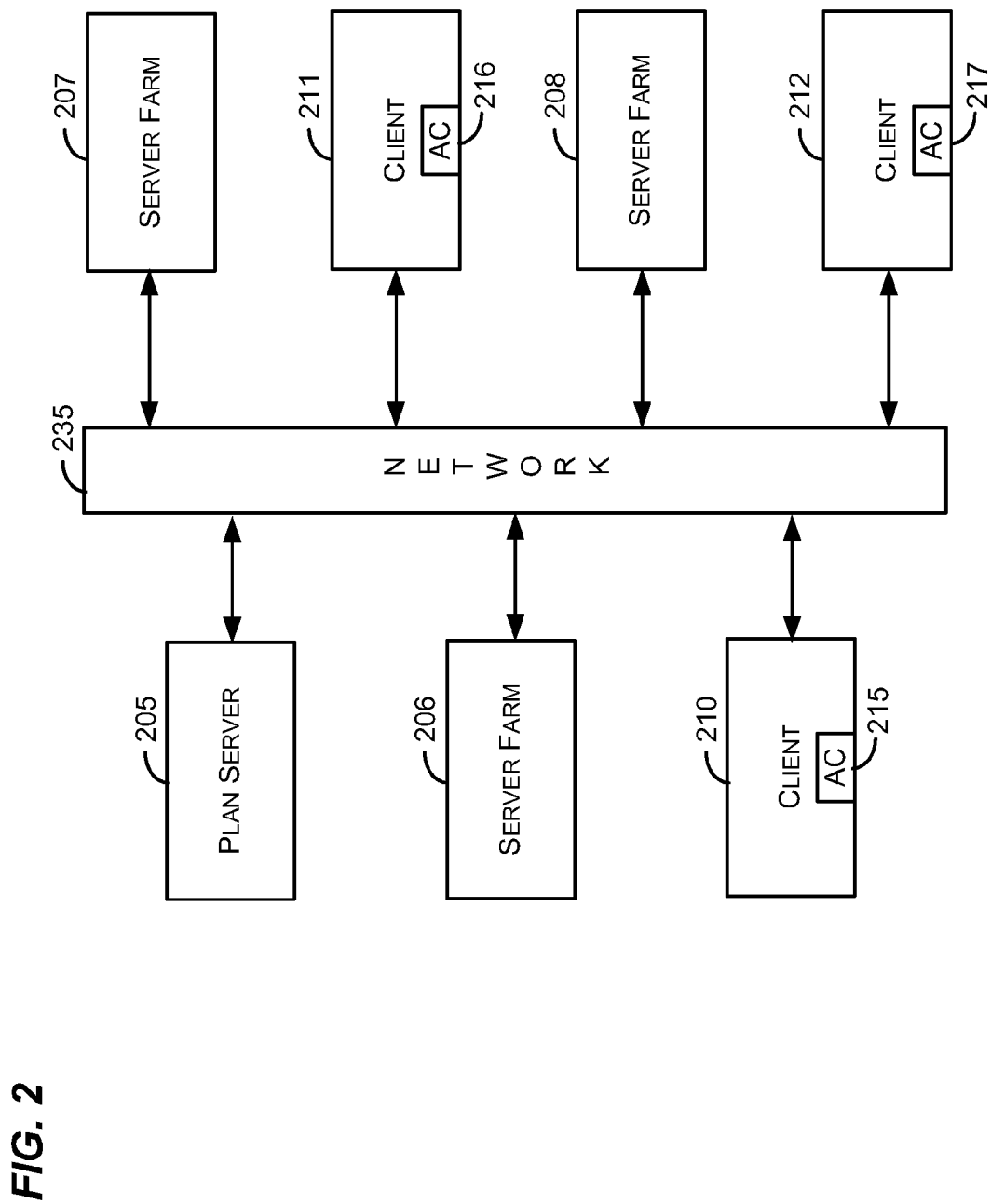
FIG. 2 is a block diagram representing an exemplary environment in which aspects of the subject matter described herein may be implemented.

FIG. 2 is a block diagram representing an exemplary environment in which aspects of the subject matter described herein may be implemented. The environment may include a plan server 205, server farms 206-208, clients 210-212, and may include other entities (not shown). In an embodiment, there may be multiple plan servers.

The various entities may be located relatively close to each other or may be distributed across the world. The various entities may communicate with each other via various networks including intra- and inter-office networks and the network 235. The clients 210-212 may include accessing components 215-217, which are described in more detail below.

In an embodiment, the network 235 may comprise the Internet. In an embodiment, the network 235 may comprise one or more local area networks, wide area networks, direct connections, virtual connections, private networks, virtual private networks, some combination of the above, and the like.

The plan server 205, the servers of the server farms 206-208, and the clients 210-212 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

A server farm (e.g., each of the server farms 206-208) may include one or more servers that may host instances or one or more databases. Unless the context dictates others, the term "instance" is to be read as "an instance of a database" while the term "instances" is to be read as "two or more instances of a database."

Instances may be hosted on various servers of various server farms. These instances may be configured in a hierarchal manner in which it is desired that certain instances, when available, are used before other instances are used. To determine what instance to attempt to access, a client (e.g., one of the clients 210-211) may use a plan. A plan may potentially include failover data, distribution data, connection data, and other data which will be described in more detail below.

A plan may be embodied in a data structure using any of many different types of languages. Some exemplary languages include XML, HTML, and other markup languages, objects, structures, collections, and other programming language constructs, and the like.

A plan may be organized in a tree structure. In the tree structure, leaf nodes may correspond to database instances, where each database instance may have its own connection policy. Intermediate nodes may indicate a policy for using and/or an algorithm for attempting to connect to instances represented by the leaf nodes or instances represented by other intermediate nodes.

Failover data indicates instances over which failover applies to access replicated data of a database. When failover applies, this means that one or more failover algorithms may be used, as needed, to attempt to access data from the database. The failover algorithm may be hard-coded, indicated in a configuration file, selected from a list of failover algorithms, indicated by the failover data, determined by some combination of the above, determined in some other way, or the like without departing from the spirit of scope of aspects of the subject matter described herein.

Generally, for an ordered set of N instances, using a failover algorithm may mean using instance (n) if and only if instances (0, n−1) are not usable. However, time to establish connections, time to obtain data, availability of instances, and other considerations may also be considered by a failover algorithm.

As will be understood by those skilled in the art, there are many failover algorithms. For example, a failover algorithm may include serially trying instances in order. If an instance is not available, a next instance may be tried, and so on until either a successful connection is established or all instances are exhausted.

As another example, a failover algorithm may include attempting to access one instance for a pre-determined period of time. If the instance is not available during the period, another instance is tried for a period of time. If the other instance is not available during the period, a third instance may be tried, and so forth to an Nth instance where N is less than or equal to the total number of instances over which failover may be applied. If the Nth instance is not available, the first instance may be tried a while longer and so forth until a timeout period elapses or access via one of the instances is successful.

In yet another example, a failover algorithm may include requesting access via two or more of the instances in parallel and selecting the instance that responds first.

The above examples regarding failover algorithms are not intended to be all-inclusive or exhaustive. Based on the teachings herein, those skilled in the art may recognize other algorithms that may be used to implement failover without departing from the spirit or scope of aspects of the subject matter described herein.

Failover data may be specified for the leaf nodes or intermediate nodes. For example, in accordance with one failover algorithm, when failover data is specified for leaf nodes (e.g., see FIG. 3A), if an attempt to use an instance fails, another instance may be tried. In one embodiment, when failover data is specified for intermediate nodes (e.g., failover node 410 of FIG. 4), if one or more attempts to use instances associated with an intermediate node (e.g., node 411) are unsuccessful, one or more attempts may be made to use instances associated with another intermediate node (e.g., node 412).

In another embodiment, when failover data is specified for intermediate nodes, if all attempts to use instances associated with an intermediate node are unsuccessful, one or more attempts may be made to use instances associated with another intermediate node.

Distribution data may indicate one or more instances to which distribution applies to access data. When distribution applies, this means that one or more distribution algorithms may be used, as needed, to attempt to access data from the database. For an unordered set of N instances, distribution usually means using any available instance (n) to access the data. For example, distribution data may be used to balance the load of requests across multiple instances.

Similar to failover, the distribution algorithm to apply may be hard-coded, indicated in a configuration file, selected from a list of distribution algorithms, indicated by the distribution data, determined by some combination of the above, determined in some other way, or the like without departing from the spirit of scope of aspects of the subject matter described herein.

Some exemplary distribution algorithms include in order, round robin, random, other distribution algorithms, and the like. These examples are not intended to be all-inclusive or exhaustive. Indeed, based on the teachings herein, those skilled in the art may recognize many other distribution algorithms that may be used without departing from the spirit or scope of aspects of the subject matter described herein.

Like failover data, distribution data may be specified for leaf nodes or intermediate nodes. When distribution data is specified for leaf nodes, the distribution data indicates that a distribution algorithm is to be applied for distributing requests to instances of the leaf nodes (e.g., see FIG. 3B). When distribution data is specified for an intermediate node (e.g., see FIG. 5), the distribution data may indicate that a distribution algorithm is to be applied for distributing requests among instances associated with other intermediate nodes.

Failover and distribution data may be encoded in the structure of a plan. For example, when an intermediate node has children nodes, this may encode that requests affected by the intermediate node are to be distributed to instances associated with the children nodes.

A node may be associated with connection data. Connection data may include attributes regarding connecting to an instance associated with the node. For example, connection data may include a timeout value that indicates how long a client is to wait for a connection to be established before assuming that an instance is non-functional. As another example, connection data may indicate a name of a database. For example, a database named DB1 on one server may be replicated as a database named DB2 on another server. Connection data may include other connection parameters or other data that is specific to one or more nodes.

Figure 3A:
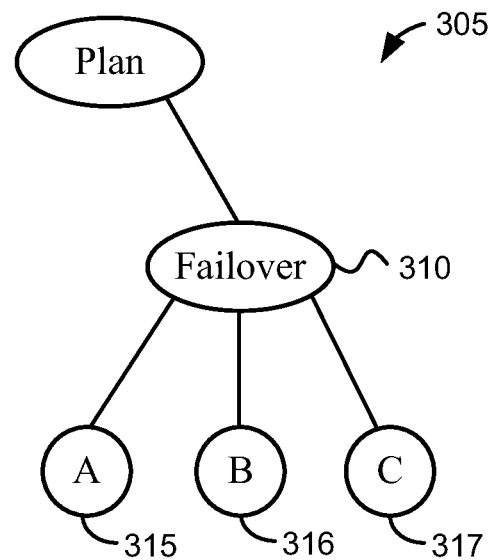
FIGS. 3A and 3B are block diagrams that represent exemplary plans in accordance with aspects of the subject matter described herein.
Figure 3B:
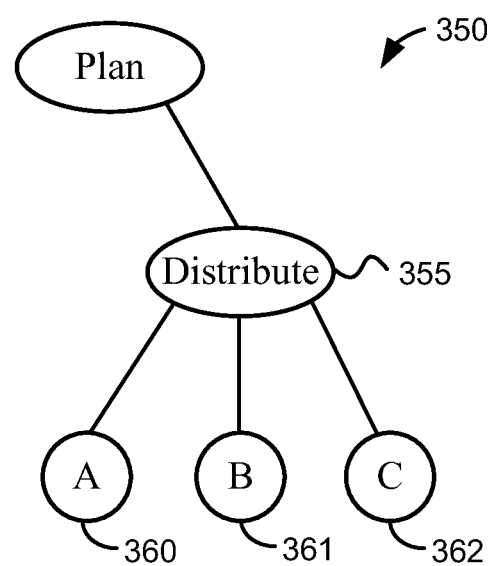

FIGS. 3A and 3B are block diagrams that represent exemplary plans in accordance with aspects of the subject matter described herein. Turning to FIG. 3A, a plan 305 includes an intermediate node 310 and leaf nodes 315-317. The intermediate node 310 indicates that a failover algorithm is to be used when selecting an instance to use.

Furthermore, the plan 305 may (but need not) indicate a specific failover algorithm to use. For example, the plan 305 may indicate that a client is to first attempt to connect with the instance corresponding to the leaf node 315. If that instance is not available, the client is then to attempt to connect with an instance corresponding to the leaf node 316. If that instance is not available, the client is then to attempt to connect with an instance corresponding to the leaf node 317.

If the leaf nodes 315-317 represent instances located at a single server farm, the plan 305 may be used, for example, to determine the order of instances to try to connect with on the single server farm. If the leaf nodes 315-317 represent instances located at different server farms, the plan 305 may be used, for example, to determine the order of instances to try across the different server farms.

Turning to FIG. 3B, an exemplary plan 350 includes an intermediate node 355 and leaf nodes 360-362. The intermediate node 355 indicates that a client is to use some type of distribution (e.g., in order, round robin, random, or the like) function to select an instance with which to connect. The plan 350 implies that the instances associated with the leaf nodes 360-362 are equivalent. Equivalent in this sense means that any available instance may be used to perform a desired access operation.

Figure 4:
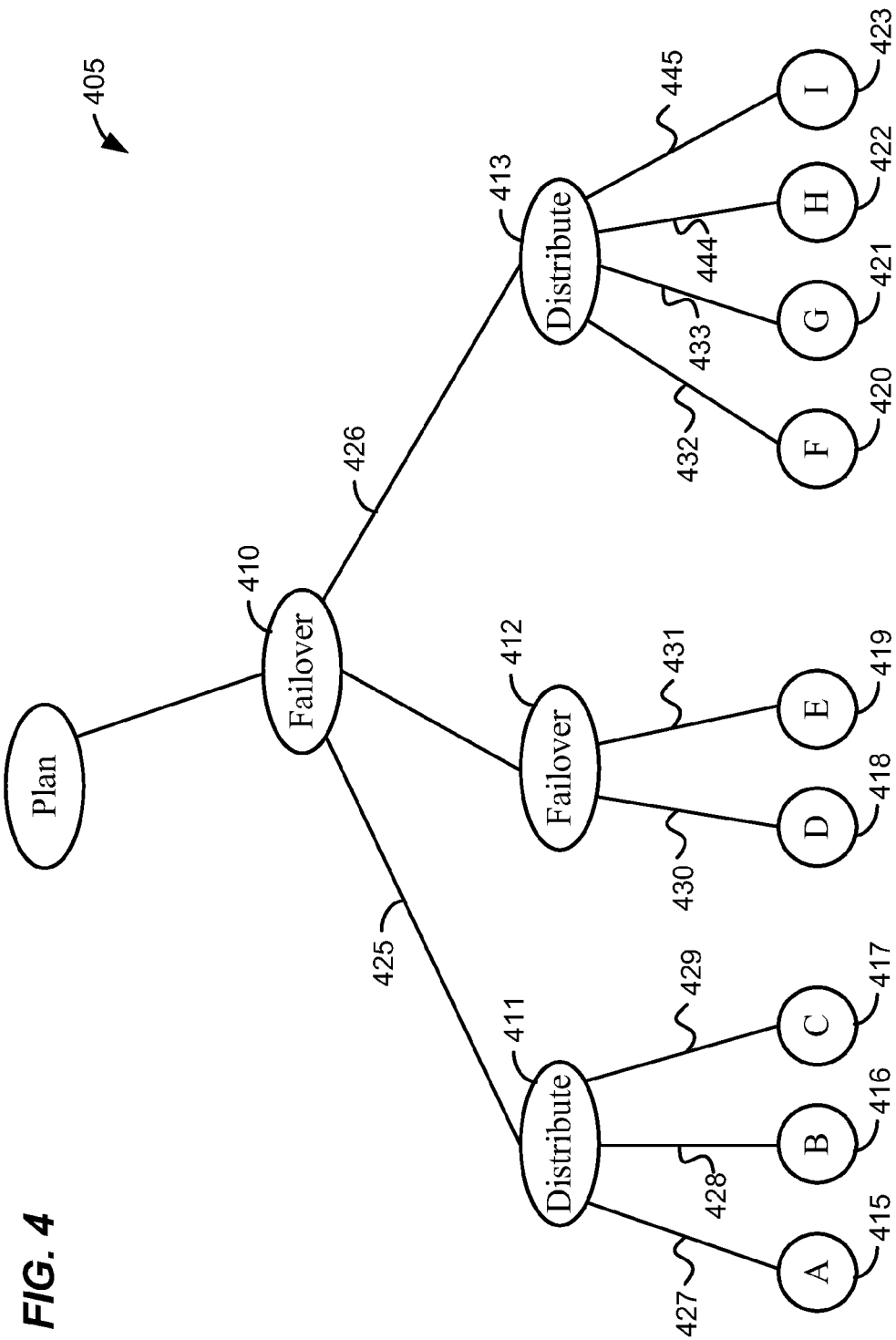
FIG. 4 is a block diagram that represents an exemplary plan having failover and distribution nodes in accordance with aspects of the subject matter described herein.

FIG. 4 is a block diagram that represents an exemplary plan having failover and distribution nodes in accordance with aspects of the subject matter described herein. Turning to FIG. 4, a plan 405 includes intermediate nodes 410-413 leaf nodes 415-423.

The intermediate node 410 indicates that a failover algorithm is to be used when selecting an instance of the intermediate nodes 411-413. The plan 405 may indicate one or more algorithms to use in accessing data from a database. For example, the intermediate node 410 may indicate that first an instance associated with the distribute node 411 is to be tried. These instances include the instances represented by the leaf nodes 415-417. If a connection request to one of these instances fails, a subsequent connection request to an instance associated with the failover intermediate node 412 is to be tried. These instances include the instances represented by the leaf nodes 418-419. If this request fails, a connection request is to be tried to another instance of the failover intermediate node 412. If this fails, a connection request to an instance associated with the intermediate node 413 is to be tried.

In other words, the plan 405 may indicate an algorithm for accessing data as follows:

1. Attempt to access the data via one of the instances associated with the leaf nodes 415-417 according to a distribution function.

2. If this fails, attempt to access the data first from the instance associated with the leaf node 418. If this fails, attempt to access the data from the instance associated with the leaf node 419.

3. If both the actions of step 2 above fail, attempt to access the data from one of the instances associated with the leaf nodes 420-423 according to a distribution function.

Note that the plan 405 does not have to indicate a specific algorithm for accessing the data. The plan may simply indicate that failover is to be used for the nodes associated with nodes 410 and 412 while distribution is to be used for the nodes associated with nodes 411 and 413.

Also note that hierarchical data is encoded in the plan 405. In particular the lines 425-445 represent relationships between the leaf nodes and/or intermediate nodes. Furthermore, the hierarchical data may also be encoded in the placement of the leaf nodes, intermediate nodes, and relationships. Hierarchical data of a plan may be represented in a variety of languages and other representations including XML and others as has been previously described.

Figure 5:
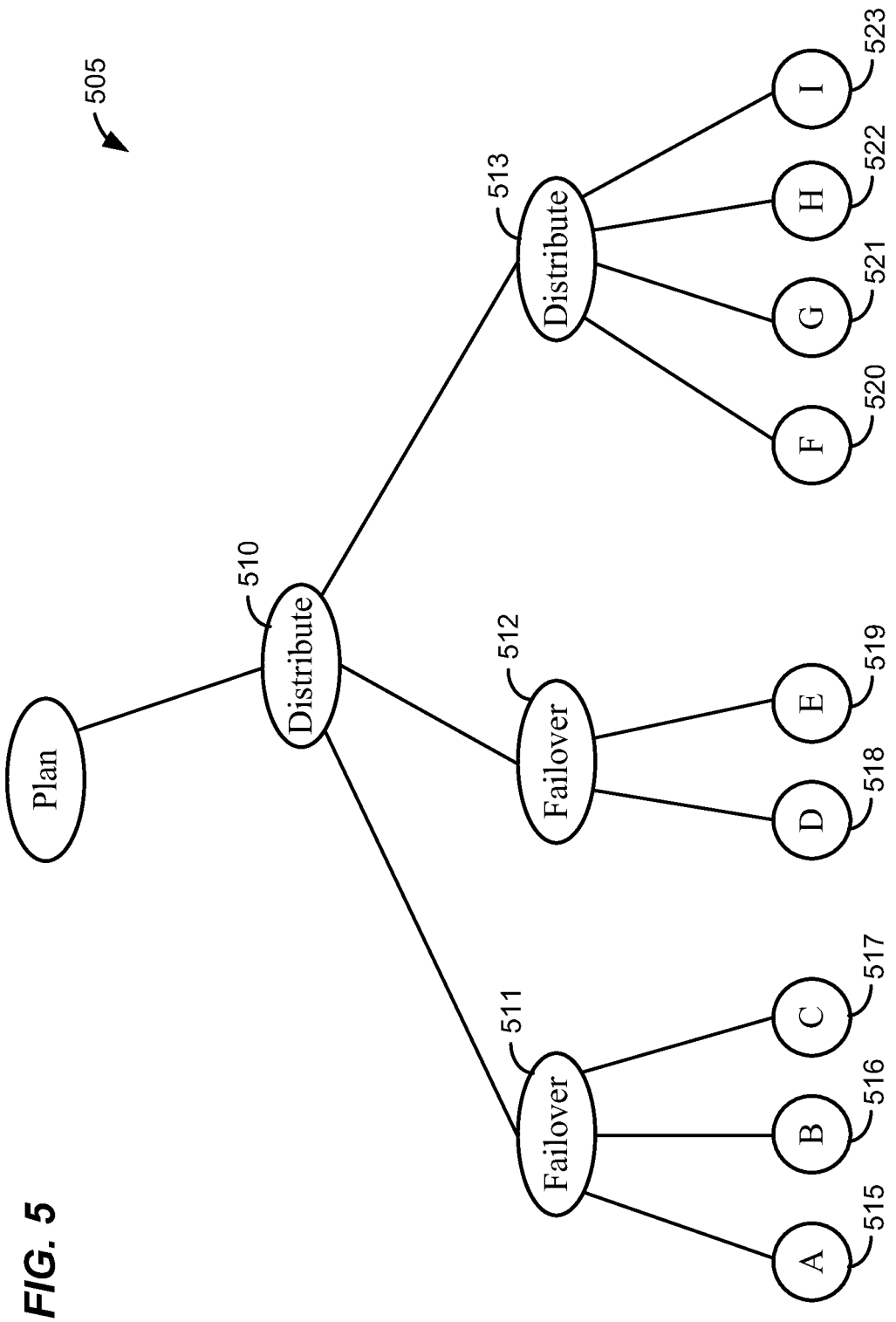
FIG. 5 is a flow diagram that generally represents exemplary actions that may occur on a node that is providing requested data in accordance with aspects of the subject matter described herein.

FIG. 5 is a block diagram that represents another exemplary plan having failover and distribution nodes in accordance with aspects of the subject matter described herein. Turning to FIG. 5, a plan 505 includes intermediate nodes 510-513 and leaf nodes 515-523.

The intermediate node 510 indicates that a distribution algorithm is to be used when determining which of the intermediate nodes 511-513 from which to select an instance with which to attempt to connect. In particular, depending on the algorithm, a client seeking to connect to an instance may select a leaf node associated with the intermediate node 511, a leaf node associated with the intermediate node 512, or a leaf node associated with the intermediate node 513.

If the distribution algorithm dictates selecting a leaf node associated with either of the intermediate nodes 511 or 512, then those nodes indicate that a failover algorithm is to be used for their associated leaf nodes. For example, if an algorithm dictates selecting a leaf node of the intermediate node 511, the plan 505 indicates that a failover algorithm is to be used to attempt to access data from the nodes 515-517.

Likewise, if the distribution algorithm dictates selecting a leaf node associated with the intermediate node 512, the plan 505 indicates that a failover algorithm is to be used to attempt to access data from the nodes 515-517.

If the distribution algorithm dictates selecting a leaf node associated with the intermediate node 513, the plan 505 indicates that the client is to use a distribution algorithm to access data from the leaf nodes 520-523.

Although FIGS. 3A and 3B illustrate one level of intermediate nodes and FIGS. 4-5 illustrate two levels of intermediate nodes, in other embodiments, more than two levels of intermediate nodes may be used in a plan without departing from the spirit or scope of aspects of the subject matter described herein. Furthermore, the plans illustrated in FIGS. 3A, 3B, and 4-5 are exemplary only. In other embodiments, the plans may include more, fewer, or different intermediate or leaf nodes.

Returning to FIG. 2, the clients 210-212 include accessing components 215-217, respectively. As used herein, the term component is to be read to include all or a portion of a device, a collection of one or more software modules or portions thereof, some combination of one or more software modules or portions thereof and one or more devices or portions thereof, and the like.

The accessing components 215-217 may include logic for obtaining and using plans. In an embodiment, an accessing component may obtain a plan from the plan server 205. In another embodiment, an accessing component may obtain a plan from a source local to the client. Such a source may be a cache, user interface, configuration file, database, or the like. After an accessing component has obtained a plan, the accessing component may then use the plan to access instances of a database according to the plan.

Although the environment described above includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 6:
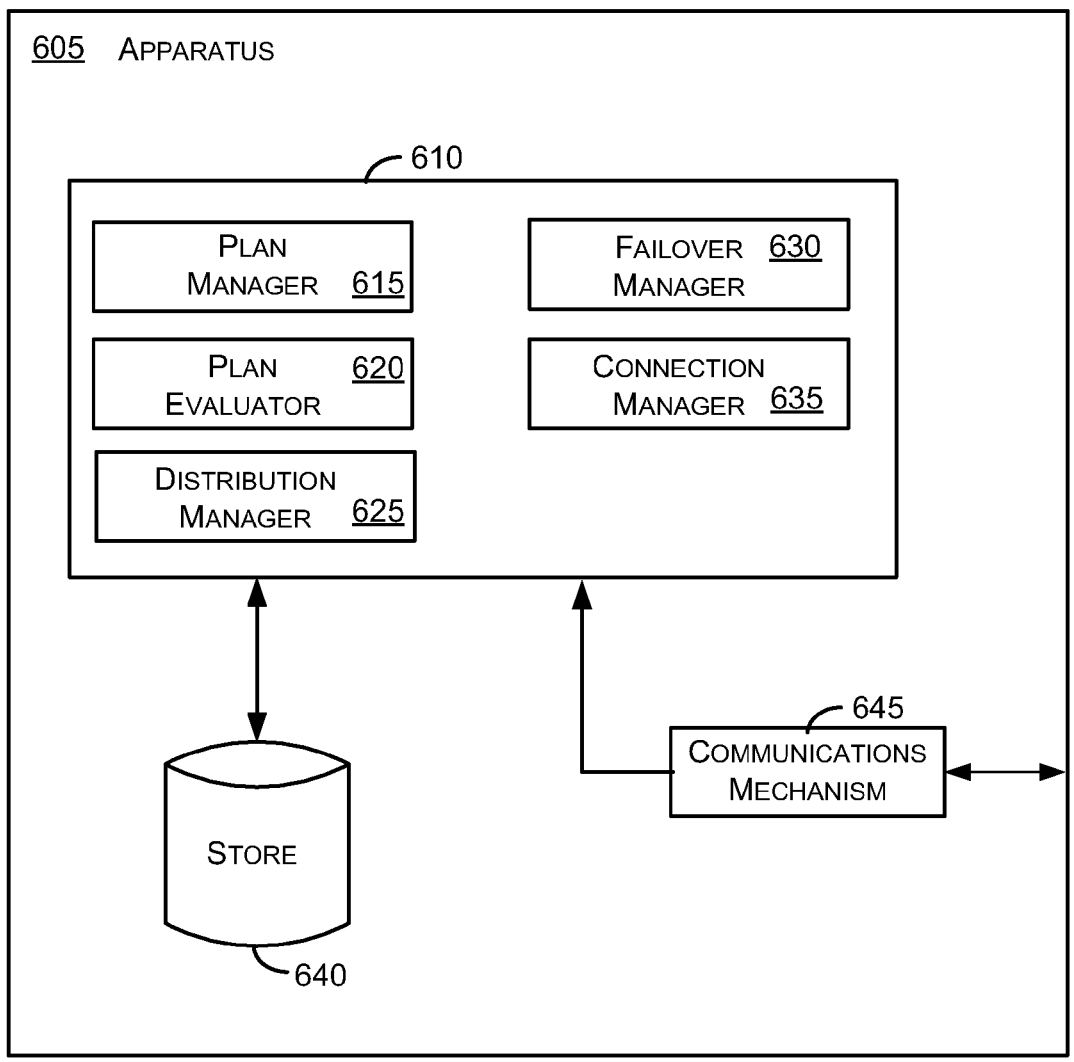
FIG. 6 is a block diagram that represents an apparatus configured in accordance with aspects of the subject matter described herein.

FIG. 6 is a block diagram that represents an apparatus configured in accordance with aspects of the subject matter described herein. The components illustrated in FIG. 6 are exemplary and are not meant to be all-inclusive of components that may be needed or included. In other embodiments, the components and/or functions described in conjunction with FIG. 6 may be included in other components (shown or not shown) or placed in subcomponents without departing from the spirit or scope of aspects of the subject matter described herein. In some embodiments, the components and/or functions described in conjunction with FIG. 6 may be distributed across multiple devices.

Turning to FIG. 6, the apparatus 605 may include accessing components 610, a store 640, a communications mechanism 645, and other components (not shown). The apparatus 605 corresponds to any of the clients 210-212 of FIG. 2 and may be implemented on or as the same or similar device(s) upon which one of the clients 210-212 may be implemented. For example, the apparatus 605 may be implemented on or as a computer (e.g., as the computer 110 of FIG. 1).

The accessing components 610 correspond to the accessing components 215-217 found on the clients 210-212 of FIG. 2. The accessing components 610 may include a plan manager 615, a plan evaluator 620, a distribution manager 625, a failover manager, 635, and other components (not shown).

The communications mechanism 645 allows the apparatus 605 to communicate with other entities. For example, the communications mechanism 645 allows the apparatus to communicate with the plan server 205, servers of the server farms 206-208, clients 210-212, and other entities reachable via the network 235. The communications mechanism 645 may be a network interface or adapter 170, modem 172, or any other mechanism for establishing communications as described in conjunction with FIG. 1.

The store 640 is any storage media capable of provide access to data involved with obtaining or following a plan. The store 640 may comprise a file system, database, volatile memory such as RAM, other storage, some combination of the above, and the like and may be distributed across multiple devices. The store 640 may be external, internal, or include components that are both internal and external to the apparatus 605.

The plan manager 615 is operable to obtain a plan that potentially includes one or more of failover data and distribution data. As indicated previously, the failover data, if any, indicates one or more instances of the database to which a failover applies to access the replicated data. The distribution data, if any, indicates one or more of the instances to which distribution applies to access the replicated data. The failover and distribution data may be encoded in intermediate nodes as well as relationships between intermediate nodes and other intermediate nodes or leaf nodes.

The plan evaluator 620 is operable to follow the plan to determine at least one instance of the database from which to access the replicated data. Some examples of following a plan have been given previously in conjunction with FIGS. 3A, 3B, and 4-5.

The distribution manager 625 may be operable to determine an algorithm for distributing access requests among the one or more instances of the database. The distribution manager 625 may be further operable to execute the algorithm to determine at least one instance of the database from which to access the replicated data in response to a request from the plan evaluator.

The failover manager 630 is operable to determine, via the failover data, whether one or more failover instances are indicated. A failover instance is an instance from which a client may attempt to access data if the client is unable to obtain the access data from one or more other instances. A failover instance may not exist, for example, if all failover leaf nodes have been exhausted. The failover manager 630 may be further operable to instruct the connection manager 635 to attempt to access the replicated data from the failover instance if the replicated data is not available from another instance.

The connection manager 635 is operable to attempt to access the replicated data from one or more instances (e.g., identified by the plan evaluator 620). The connection manager 635 is further operable to use connection data associated with each instance in conjunction with attempting to access the replicated data from the instance.

Figure 7:
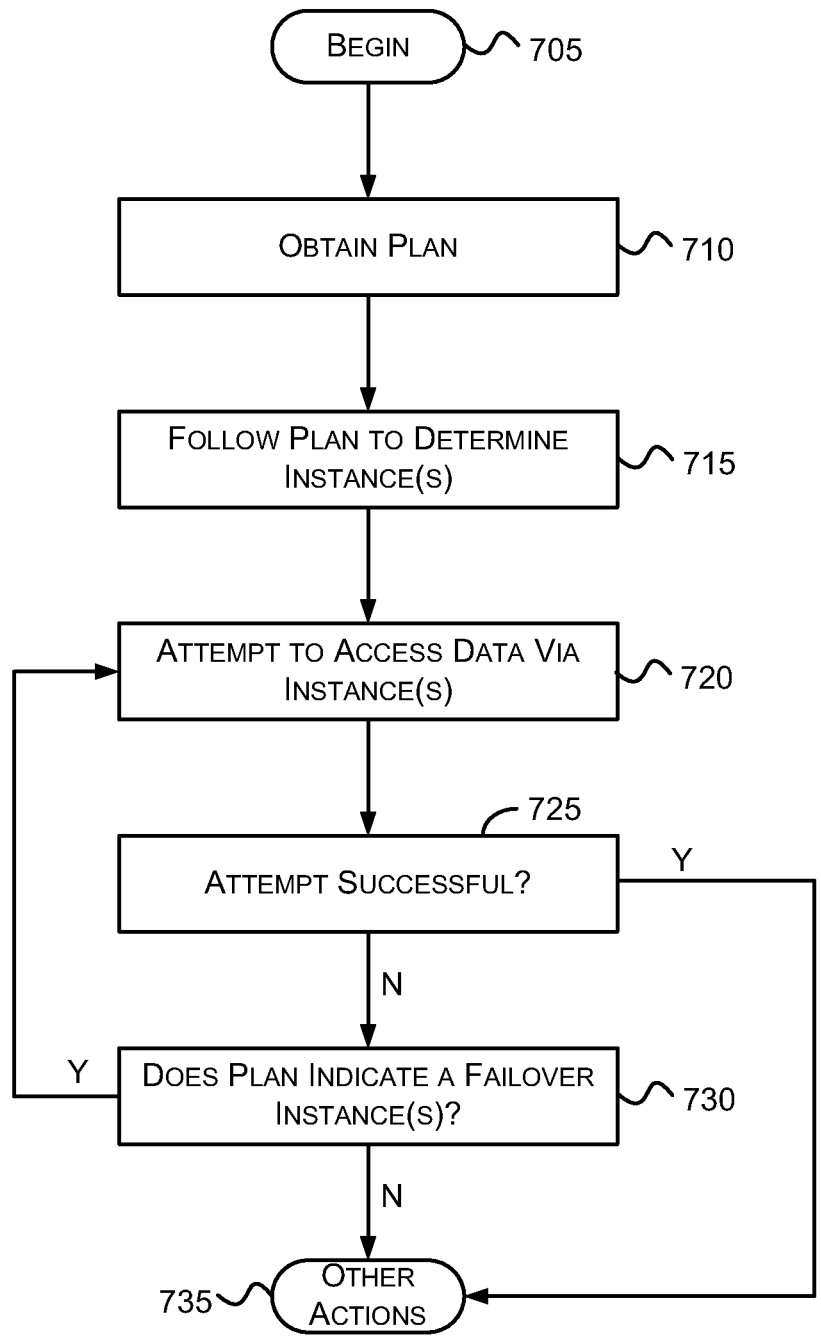
FIG. 7 is a flow diagram that generally represents actions that may occur in accordance with aspects of the subject matter described herein.

FIG. 7 is a flow diagram that generally represents actions that may occur in accordance with aspects of the subject matter described herein. For simplicity of explanation, the methodology described in conjunction with FIG. 7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 7, at block 705, the actions begin. For example, referring to FIG. 2, the client 211 may seek to access data of a database that is replicated by instances hosted by servers of the server farms 206-208.

At block 710, a plan for accessing the data is obtained. For example, referring to FIG. 2, the client may retrieve data associated with the plan from a memory of the client. As indicated earlier, the plan may potentially include failover data, distribution data, or both failover and distribution data. The failover data, if any, one or more instances to which failover applies to access the replicated data. The distribution data, if any, indicates one or more instances to which distribution applies to access the replicated data.

As mentioned previously, the plan may be obtained from a source local to the client (e.g., by retrieving data associated with the plan from volatile or nonvolatile memory of the client), by obtaining data associated with the plan from a user interface, or by obtaining the plan from an external source (e.g., a plan server external to the client). When obtaining the plan from an external source, the client may contact the external source and request the plan therefrom.

At block 715, the plan is evaluated to determine a one or more instances. For example, referring to FIG. 6, the plan evaluator 620 evaluates the plan to determine at least one instance of the database from which to attempt to access the replicated data. Referring to FIG. 2, these one or more instances may, for example, be located on a server of the server farm 207.

At block 720, an attempt is made to access the data via the one or more instances. For example, referring to FIG. 2, the client 211 attempts to access the instance hosted by a server of the server farm 207.

At block 725, a determination is made as to whether the attempt is successful. If so the actions continue at block 735; otherwise, the actions continue at block 730. For example, referring to FIG. 2, if the client 211 determines whether it was successful in accessing the data from the server of the server farm 207.

At block 730, a determination is made as to whether the plan indicates a failover instance. If so, the actions continue at block 720; otherwise, the actions continue at block 735. For example, referring to FIGS. 3A and 6, after failing to obtain the data from the instance associated with the leaf node 315, the failover manager 630, determines that a failover instance (e.g., the failover instance associated with the leaf node 316) is available. This failover instance may then be used for another iteration of the actions associated with blocks 720-730.

At block 735, other actions, if any, may be performed.

As can be seen from the foregoing detailed description, aspects have been described related to database connectivity behavior. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented on a client device having at least one processor, the method comprising:

seeking to access data of a database that is replicated by multiple instances of the database, the multiple instances hosted by multiple servers in multiple server farms, wherein the data is stored in at least one instance of a database that is accessed through a server in a server farm and which is replicated in another instance that is accessed through a different server in a different server farm;

accessing a plan to determine from which server the data can be accessed, the plan including distribution data, failover data, and connection data, the distribution data indicates which server to access the data, the failover data indicates which server to access the data when other instances are unavailable, the connection data indicates how to connect to a server hosting the data;

using the distribution data to determine that a first select server hosts the data;

attempting to access the first select server based on the connection data; and upon failing to access the first select server, using the failover data to determine that a second select server hosts data.

2. The method of claim 1, wherein the failover data includes a failover process that proceeds to access the first select server for a first period of time and then proceeds to attempt to access the second select server for a second period of time when the first select server is unavailable.

3. The method of claim 1, wherein the failover data includes a failover process that proceeds to access both the first select server and the second select server simultaneously and to select whichever server responds first to access the data.

4. The method of claim 1, wherein the connection data includes a timeout value that indicates a length of time to wait to establish a connection.

5. The method of claim 1, wherein the distribution data includes at least one distribution process that is based on one of an ordered selection, a random selection or a round robin selection.

6. The method of claim 1, wherein the plan comprises a tree-structured representation having a plurality of nodes, a first subset of nodes including intermediate nodes, and a second subset of nodes including leaf nodes, each leaf node representing a server hosting an instance of a database and connection data, each intermediate node connected to one or more leaf nodes, each intermediate node representing a distribution process or a failover process associated with the leaf nodes connected thereto.

7. The method of claim 6, further comprising:
traversing the tree-structured representation to find a server to access the data.

8. A non-transitory computer-readable storage medium storing instructions that when executed on a processor causes the processor to perform actions comprising:

seeking to access data of a database that is replicated by multiple instances of the database, the multiple instances hosted by multiple servers in multiple server farms, wherein the data is stored in at least one instance that is accessed through a server in a server farm and which is replicated in another instance that is accessed through a different server in a different server farm;

accessing a plan to determine which server the data can be accessed, the plan including distribution data, failover data, and connection data, the distribution data indicates which server to access the data, the failover data indicates which server to access the data when other instances are unavailable, the connection data indicates how to connect to a server hosting the data;

using the distribution data to determine that a first select server hosts the data;

attempting to access the first select server based on the connection data; and upon failing to access the first select server, using the failover data to determine that a second select server hosts the data.

9. The non-transitory computer-readable storage medium of claim 8, wherein the failover data includes a failover process that proceeds to access the first select server for a first period of time and then proceeds to attempt to access the second select server for a second period of time when the first select server is unavailable.

10. The non-transitory computer-readable storage medium of claim 8, wherein the failover data includes a failover process that proceeds to access both the first select server and the second select server simultaneously and to select whichever server responds first to access the requested data.

11. The non-transitory computer-readable storage medium device of claim 8, wherein the connection data includes a timeout value that indicates a length of time to wait to establish a connection.

12. The non-transitory computer-readable storage medium of claim 8, wherein the distribution data includes at least one distribution process that is based on one of an ordered selection, a random selection or a round robin selection.

13. The non-transitory computer-readable storage medium of claim 8, wherein the plan comprises a tree-structured representation having a plurality of nodes, a first subset of nodes including intermediate nodes, and a second subset of nodes including leaf nodes, each leaf node representing a server and connection data, each intermediate node connected to one or more leaf nodes, each intermediate node representing a distribution process or a failover process associated with the leaf nodes connected thereto.

14. The non-transitory computer-readable storage medium of claim 13, further comprising:
traversing the tree-structured representation to find the at least one server from which to access the data.

15. A system comprising:
at least one processor and at least one memory;
the at least one memory including the following processor-executable program modules:

a plan manager that obtains a plan to access data of a database that is replicated by multiple instances hosted by multiple servers in multiple server farms, wherein the data is stored in at least one instance that is accessed through a server in a server farm and which is replicated in another instance that is accessed through a different server in a different server farm, the plan including distribution data, failover data, and connection data, the distribution data indicates which server to access the data, the failover data indicates which server to access the data when other instances are unavailable, the connection data indicates how to connect to a server hosting the data;

a plan evaluator that utilizes the plan to determine a selected server from which to access the data;

a distribution manager that determines which distribution process to use to distribute a request to access the data;

a failover manager that determines from which server to access the data when the selected server is unavailable; and a connection manager that accesses the data from the selected server using the connection data.

16. The system of claim 15, wherein the failover data includes a failover process that proceeds to access the selected server for a first period of time and then proceeds to attempt to access a second selected server for a second period of time when the first selected server is unavailable.

17. The system of claim 15, wherein the failover data includes a failover process that proceeds to access both the first selected server and the second selected server simultaneously and to select whichever server responds first to access the data.

18. The system of claim 15, wherein the plan comprises a tree-structured representation having a plurality of nodes, a first subset of nodes including intermediate nodes, and a second subset of nodes including leaf nodes, each leaf node representing a server and connection data, each intermediate node connected to one or more leaf nodes, each intermediate node representing a distribution process or a failover process associated with the leaf nodes connected thereto.

19. The system of claim 18, wherein the plan manager traverses the tree-structured representation to find a server from which to access the data.

20. The system of claim 18, wherein the plan manager traverses the tree-structured representation to find at least one failover server from which to access the data when the server is unavailable.

* * * * *